United States Patent Office 3,532,759
Patented Oct. 6, 1970

3,532,759
ARYL ETHERS AND PROCESS OF PRODUCING THE SAME
Hermann Schnell, Krefeld-Uerdingen, Ludwig Bottenbruch, Krefeld-Bockum, Gerhard Darsow, Krefeld-Uerdingen, Germany, assignors to Farbenfabriken Bayer Aktiengesellschaft, Leverkusen, Germany, a corporation of Germany
No Drawing. Filed Mar. 3, 1967, Ser. No. 620,234
Claims priority, application Germany, Mar. 16, 1966,
F 48,669
Int. Cl. C07c 43/22
U.S. Cl. 260—613          5 Claims

ABSTRACT OF THE DISCLOSURE

Reaction of alkali metal phenolates with hexachlorobenzene in the presence of strongly polar inert organic solvents at an elevated temperature to produce novel aryl ethers.

---

It has been found that alkali metal phenolates are reacted, in the presence of a strongly polar, inert organic solvent and at an elevated temperature, not only, as is known with aromatic compounds containing halogen atoms which are attached to the benzene ring and activated by electron-absorbing groups, such as nitro, nitroso and sulphone groups, to give the corresponding aryl ethers or aryl polyethers (cf. U.S. patent specification No. 3,032,594 and Dutch patent application published under No. 6,408,130), but also with hexachlorobenzene. In this reaction, up to three chlorine atoms can react and may be replaced by either groups. Ethers or polyethers of this type were hitherto not known.

The object of the present invention, therefore, comprises a process for the production of novel aryl ethers or aryl polyethers by the reaction of alkali metal phenolates with a holobenzene in the presence of a strongly polar, inert organic solvent at an elevated temperature, this process being characterised by reacting hexachlorobenzene as the halobenzene.

Suitable reaction temperatures lie between about 100 and about 180° C. and preferably between about 120 and about 160° C.

For the choice of the phenols a great variety of possibilities exists. Mono- or polyhydric phenols can be reacted. The hydroxyl groups of the di- or polyhydric phenols can be attached to the same nucleus (e.g. hydroquinone, resorcinol, pyrogallol, hydroxy-hydroquinone, phloroglucinol) or to different nuclei (e.g. 4,4-dihydroxyphenyl, bis - (hydroxyphenyl)-alkanes, -ether, -sulphide, -sulphone, trisphenols etc.). They can stand in relation to one another in the ortho-, meta- or para-position. In addition to the hydroxyl groups, the aromatic nucleus can exhibit other inert inorganic or organic substituents, such as halogen atoms and lower alkyl groups, under the condition that sterically large substituents in adjacent position to the hydroxyl groups do not fundamentally endanger the reactivity of the latter due to steric inhibition.

The corresponding alkali metal phenolates are preferably produced in situ, by dissolving the phenol in a sufficient amount of the strongly polar solvent to be used for the future reaction adding the stoichiometric amount of alkali metal hydroxide, e.g. sodium or potassium hydroxide, and heating the reaction mixture at about 120 to about 140° C. for some time, e.g. 4–6 hours, and distilling off the water eliminated during the phenolate formation. In order to obtain a rapid and complete removal of the water, it is advantageous to add an entraining agent, for example, benzene or xylene, and to distill off the water from the mixture azeotropically with the additional solvent.

The proportion between hexachlorobenzene and phenolate can be chosen in such a way that up three phenolate groups are used per one mole hexachlorobenzene and/or one mole hexachlorobenzene is used per each phenolate group.

Examples of suitable strong polar, inert organic solvents include, for example, diethyl sulphoxide, dimethyl sulphone, diethyl sulphone, di-isopropyl sulphone and tetramethyl sulphone, dimethyl sulphoxide, however, being preferred.

The new aryl ethers can be used as flame-resistant additives or plasticizers to plastics such as, for example, polyesters and epoxy resins.

EXAMPLE 1

Phenyl-pentachlorophenyl ether

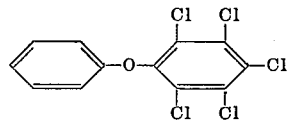

4.7 grams (0.05 mole) phenol, dissolved in 50 ml. dimethyl sulphoxide (DMSO) and 30 ml. benzene, are placed in a 250 ml.-glass flask which is provided with a gas inlet tube, a stirrer, a thermometer, a water receiver and a reflux condenser. A weak nitrogen current is passed through this apparatus followed by the addition of 2.8 g. (0.05 mole) potassium hydroxide. The reaction mixture is then heated at a temperature of 130° C. for 4 hours. The water which is eliminated by the salt formation distils azeotropically with the benzene into the water receiving device in which it separates, whilst the benzene is recycled into the reaction mixture. The latter is allowed to cool and 14.25 g. (0.05 mole) hexachlorobenzene, dissolved in 100 ml. DMSO, are added. The mixture is then heated at 140° C. for 4 hours and the liberated potassium chloride which is insoluble in DMSO, separates. When the reaction is completed, the reaction mixture is poured into 300 ml. water acidified with sulphuric acid, and the water rapidly agitated by means of a stirrer. The ether immediately separates in crystalline form.

The ether is collected on a suction filter and washed with a 5% sodium hydroxide solution. It is then acidified with dilute sulphuric acid and washed with water until neutral. After drying, the ether is purified by repeated recrystallisation from ligroin. If it is coloured, it can easily be de-coloured with active charcoal in ligroin. Snowwhite, fine crystals of melting point 132–133° C. are obtained. Yield: 84% of theory.

*Analysis.*—Calcd. (percent): C, 42.1; H, 1.5; O, 4.7; Cl, 51.7. Found (percent): C, 42.0 H, 1.60 O, 4.3 Cl, 51.9.

EXAMPLE 2

α-naphthylpentachlorophenyl ether

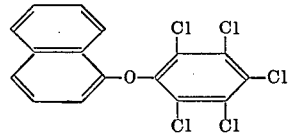

7.2 grams (0.05 mole) α-naphthol, dissolved in 70 ml. DMSO and 30 ml. benzene, are reacted with 2.8 g. (0.05 mole) potassium hydroxide, in an apparatus described in Example 1, by heating at 140° C. for 4 hours to give the potassium salt of the naphthol. The water formed in the reaction is completely removed by an azeotropic distillation with benzene. The reaction mixture is then allowed to cool, followed by the addition of 14.25 g. (0.05 mole) hexachlorobenzene, dissolved in 100 ml. DMSO. The reaction mixture is then heated at 140° C. for 4 hours and then poured into 300 ml. water which is acidified with sulphuric acid and vigorously agitated by means of a stirrer. The ether which separates is filtered off with suction and purified according to Example 1. White crystals of melting point 159–160° C. are obtained. Yield: 85% of theory.

*Analysis.*—Calcd. (percent): C, 49.0; H, 1.8; O, 4.1; Cl, 45.1. Found (percent): C, 48.0; H, 1.9; O, 4.0; Cl, 45.3.

EXAMPLE 3

β-naphthyl-pentachlorophenyl ether

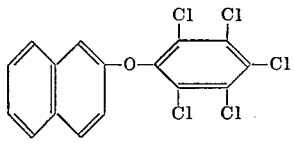

The β-naphthyl-pentachlorophenyl ether is prepared in the same manner as the α-naphthyl-pentachlorophenyl ether described in Example 2. β-Naphthol is used, instead of α-naphthol, White crystals of melting point 144–146° C. are obtained. Yield: 79% of theory.

*Analysis.*—Calcd. (percent): C,49.0; H, 1.8; O, 4.1; Cl, 45.1. Found (percent): C, 47.8; H, 1.9; O, 4.0; Cl, 45.4.

EXAMPLE 4

3,5-dimethylphenyl-pentachlorophenyl ether

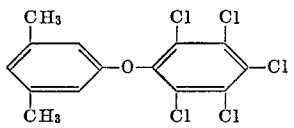

6.14 grams (0.05 mole) 3,5-dimethylphenol are dissolved in 70 ml. DMSO and 30 ml. benzene and reacted with 1.95 g. (0.05 mole) sodium hydroxide, in an apparatus described in Example 1, by heating the mixture at 140° C. for 4 hours to give the sodium salt, and the water formed as azeotrope with benzene is distilled off. After cooling, 14.25 g. (0.05 mole) hexachlorobenzene, dissolved in 100 ml. DMSO, are added and the mixture is heated at 140° C. for 4 hours. When the reaction is completed, the mixture is poured into 300 ml. acidified water. The ether which separates is filtered off with suction, washed with a 5% sodium hydroxide solution, acidified with sulphuric acid and washed until neutral. The dry crude product is repeatedly recrystallised from alcohol and de-colourized by the addition of active charcoal. The ether is thus obtained in the form of fine white crystals of melting point 122° C. are obtained. Yield: 78% of theory.

*Analysis.*—Calcd. (percent): C, 45.4; H, 2.4; O, 4.3; Cl, 47.9. Found (percent): C, 44.8; H, 2.3; O, 4.4; Cl, 48.1.

EXAMPLE 5

2,6-dimethylphenyl-pentachlorophenyl ether

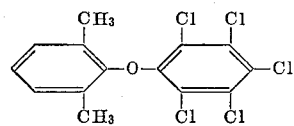

The 2,6-dimethylphenyl-pentachlorophenyl ether is prepared in the same manner as the 3,5-dimethylphenyl-pentachlorophenyl ether described in Example 4, but with the use of 2,6-dimethylphenol. Fine white crystalline needles of melting point 122° C. are obtained. Yield: 78% of theory.

*Analysis.*—Calcd. (percent): C, 45.4; H, 2.4; O, 4.3; Cl, 47.9. Found (percent): C, 44.7; H, 2.3; D, 4.1; Cl, 48.2.

EXAMPLE 6

2,4,6-trimethylphenyl-pentachlorophenyl ether

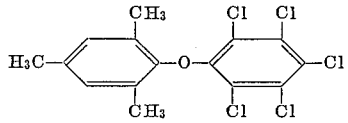

The 2,4,6-trimethylphenyl-pentachlorophenyl ether is prepared in the same manner as the 3,5-dimethylphenyl-pentachlorophenyl ether obtained according to Example 4, but with the use of the corresponding amount of 2,4,6-trimethylphenol (Mesitol). Fine white crystals of melting point 147–148° C. are obtained. Yield: 81% of theory.

*Analysis.*—Calcd. (percent): C, 46.8; H, 2.9; O, 4.2; Cl 46.1. Found (percent): C, 46.1; H, 2.8; O, 4.1; Cl, 47.0.

EXAMPLE 7

2,6-dichlorophenyl-pentachlorophenyl ether

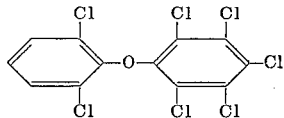

8.15 grams (0.05 mole) 2,6-dichlorophenol are dissolved in 100 ml. DMSO and 30 ml. benzene and reacted with 2.8 g. (0.05 mole) potassium hydroxide, in an apparatus described in Example 1, by heating the mixture at 140° C. for 4 hours to give the potassium salt and the water formed is distilled off as azeotrope with benzene. After cooling, 14.25 g. hexachlorobenzene, dissolved in 100 ml. DMSO, are added to the mixture which is heated at 140° C. for 4 hours. When the reaction is completed, the mixture is poured into 300 ml. acidified water. The separating ether is filtered off with suction, washed with a 5% sodium hydroxide solution, acidified with sulphuric acid and washed until neutral. The crude product is dissolved in hot alcohol and decolourized with active charcoal. Unreacted hexachlorobenzene is removed by repeated recrystallisation from alcohol. Fine white crystals of melting point 147–148° C. are obtained. Yield: 51% of theory.

*Analysis.*—Calcd. (percent): C, 35.1; H, 0.7; O, 3.9; Cl, 60.3. Found (percent): C, 34.3; H, 0.8; O, 3.7; Cl, 60.9.

EXAMPLE 8

1,4-bis(pentachlorophenoxy)benzene

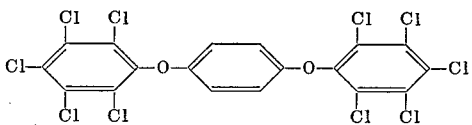

2.75 g. (0.025 mole) hydroquinone are dissolved in 40 ml. DSMO and 30 ml. benzene and reacted with 2.8 g. (0.05 mole) potassium hydroxide, as described in Example 1, to give the dipotassium salt. After cooling, 14.25 g. (0.05 mole) hexachlorobenzene, dissolved in 100 ml. DMSO, are added. The reaction mixture is then heated at 140° C. for 4 hours. Working up is carried out as described in Example 7. Fine white crystals of melting point 281–282° C. are obtained. Yield: 73% of theory.

*Analysis.*—Calcd. (percent): C, 35.66; H, 0.66; O, 5.28; Cl, 58.40. Found (percent): C, 34.9; H, 0.7; O, 5.0; Cl, 59.0.

EXAMPLE 9

4,4′-bis-(pentachlorophenoxy)-diphenyl

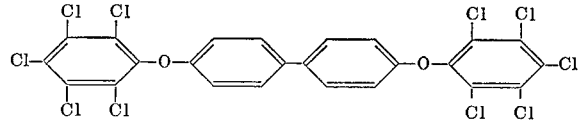

The dispotassium salt is prepared from 4.65 g. (0.025 mole) 4,4′-dihydroxy-diphenyl and 2.8 g. (0.05 mole) potassium hydroxide. The dipotassium salt is reacted with 14.25 g. (0.05 mole) hexachlorobenzene by heating at 130° C. for 4 hours to give the ether. After working up as described in Example 7, a white powder of melting point 317–319 C. is obtained. Yield: 84% of theory.

*Analysis.*—Calcd. (percent): C, 42.2; H, 1.2; O, 4.7; Cl, 51.9. Found (percent): C, 42.0; H, 1.4; O, 4.2; Cl, 51.4.

EXAMPLE 10

A mixture of oligomeric chlorophenyl ether obtained from hexachlorobenzene and bisphenol A

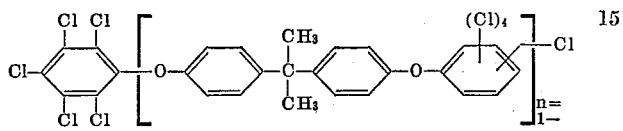

11.4 grams (0.05 mole) bisphenol A, dissolved in 70 ml. DMSO and 30 ml. benzene, are reacted with 5.61 g. (0.1 mole) potassium hydroxide, in an apparatus described in Example 1, by heating the solution at 140° C. for 4 hours to give the potassium salt. The water formed in the reaction is removed with the benzene by azeotropic distillation. When the reaction is completed, the mixture is allowed to cool, followed by the addition of 14.25 g. (0.05 mole) hexachlorobenzene, dissolved in 100 ml. DMSO. The mixture is then heated at 140° C. for 4 hours and then slowly poured into 300 ml. acidified water which is vigorously agitated by means of a stirrer. A white powder which is soluble in methylene chloride is obtained. It is collected on a suction filter and washed with a 5% aqueous sodium hydroxide solution. It is then acidified with dilute sulphuric acid and washed with water until neutral. The product obtained is a mixture of oligomeric chlorophenyl ethers of the above formula. Yield: 96% of theory. Average molecular weight: 1100.

*Analysis.*—Found (percent): C, 48.9; H, 2.6; O, 4.2; Cl, 43.3.

EXAMPLE 11

Cross-linked polycondensation product of hexachlorobenzenen and bisphenol A

The product is prepared in the same manner as that described in Example 10, but twice the quantity of bisphenol A (22.8 g.=0.1 mole) is used. A strongly cross-linked, infusible polycondensation product is obtained, which is still swellable but no longer soluble in methylene chloride. Yield: 91% of theory.

*Analysis.*—C, 68.6%; H, 4.6%; Cl, 16.3%, O, 10.4%.

EXAMPLE 12

1,3,5-triphenoxy-2,4,6-trichlorobenzene

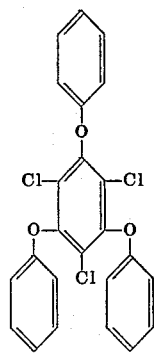

14.12 grams (0.15 mole) phenol are dissolved in 50 ml. DMSO and 30 ml. benzene and reacted, as described in Example 1, with 8.4 g. (0.15 mole) potassium hydroxide to give the potassium salt. After cooling, 14.25 g. (0.05 mole) hexachlorobenzene, dissolved in 100 ml. DMSO, are added. The mixture is heated at 140° C. for 4 hours and worked up as described in Example 1. A white crystalline powder of melting point 181–183° C. is obtained. Yield: 81% of theory.

*Analysis.*—Calcd. (percent): C, 63.0; H, 3.3; O, 10.5; Cl, 23.2. Found (percent): C, 62.7; H, 3.4; O, 10.2; Cl, 23.6.

EXAMPLE 13

1,3,5-tris-(pentachlorophenoxy)benzene

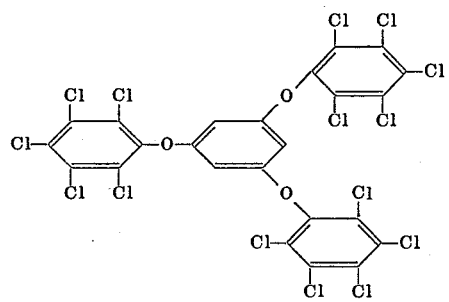

The potassium salt is prepared from 2.2 g. (0.0167 mole) phloroglucinol and 2.8 g. (0.05 mole) potassium hydroxide. The potassium salt is reacted, as described in Example 7, with 14.25 g. (0.05 mole) hexachlorobenzene to give the ether. A white, well-crystallised powder of decomposition point 281° C. is obtained. Yield: 48% of theory.

*Analysis.*—Calcd. (percent): C, 33.1; H, 0.4; O, 5.5; Cl, 61.0. Found (percent): C, 32.7; H, 0.5; O, 5.2; Cl, 61.3.

What is claimed is:

1. Aryl ethers selected from the group consisting of:

(A) 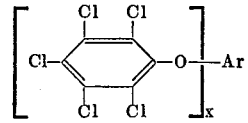

wherein $x$ is the integer 2 or 3; Ar is paraphenylene or paradiphenylene when $x$ is 2 and Ar is

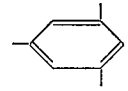

when $x$ is 3;

(B)

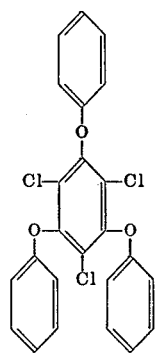

and (C)

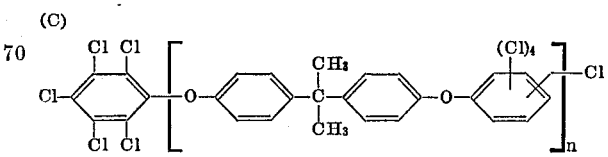

wherein $n$ is an integer of from 1 to 6.

2. 1,4-bis(pentachlorophenoxy)benzene.
3. 4,4'-bis(pentachlorophenoxy)-biphenyl.
4. 1,3,5-triphenoxy-2,4,6-trichlorobenzene.
5. 1,3,5-tri(pentachlorophenoxy)benzene.

References Cited

UNITED STATES PATENTS

| | | | |
|---|---|---|---|
| 3,391,195 | 7/1968 | Blake et al. | 260—613 |
| 2,615,823 | 10/1952 | Lawlor et al. | 260—13 XR |
| 3,032,594 | 5/1962 | Towle | 260—612 |
| 3,056,843 | 10/1962 | Wismer | 260—613 |
| 3,294,846 | 12/1966 | Livak et al. | 260—613 |

FOREIGN PATENTS 1,327,189  4/1963  France.

BERNARD HELFIN, Primary Examiner

U.S. Cl. X.R.

260—45.7, 612